United States Patent [19]
Seifert et al.

[11] 4,366,934
[45] Jan. 4, 1983

[54] ROLL-UP DEVICE FOR SAFETY BELT

[75] Inventors: Helmut Seifert, Schwäbisch Gmünd; Wolf-Dieter Hönl, Mutlangen; Johannes Schmid, Schwäbisch Gmünd; Bernhard Frey, Waldstetten, all of Fed. Rep. of Germany

[73] Assignee: Repa Feinstanzwerk GmbH, Alfdorf, Fed. Rep. of Germany

[21] Appl. No.: 271,829

[22] Filed: Jun. 9, 1981

Related U.S. Application Data

[63] Continuation of Ser. No. 59,624, Jul. 23, 1979, abandoned.

[30] Foreign Application Priority Data

Jul. 21, 1978 [DE] Fed. Rep. of Germany ....... 2832159

[51] Int. Cl.³ .................... A62B 35/02; B65H 75/48
[52] U.S. Cl. ................................ 242/107.4 A
[58] Field of Search ...................... 242/107–107.7; 280/803, 806, 807; 297/474–478

[56] References Cited

U.S. PATENT DOCUMENTS

| 3,552,676 | 1/1971 | Weber | 242/107.4 B X |
| 4,065,071 | 12/1977 | Holmberg | 242/107.4 B |
| 4,101,092 | 7/1978 | Schmelow | 242/107.4 B |
| 4,136,841 | 1/1979 | Fohl | 242/107 |
| 4,277,036 | 7/1981 | Seifert et al. | 242/107.4 A |

Primary Examiner—John M. Jillions
Attorney, Agent, or Firm—Herbert L. Lerner

[57] ABSTRACT

Roll-up device for a safety belt with a provision to block the belt shaft in case of danger by locking pawl means with locking teeth and locking pawl, in which an automatically triggered release mechanism is triggered when the vehicle exceeds a permissible acceleration or deceleration and through a control element activates the locking pawl means. The locking teeth as well as the locking pawl are disposed within a cutout through which the belt shaft passes. The cutout is located in at least one of the side plates of the basic frame of the roll-up device.

11 Claims, 7 Drawing Figures

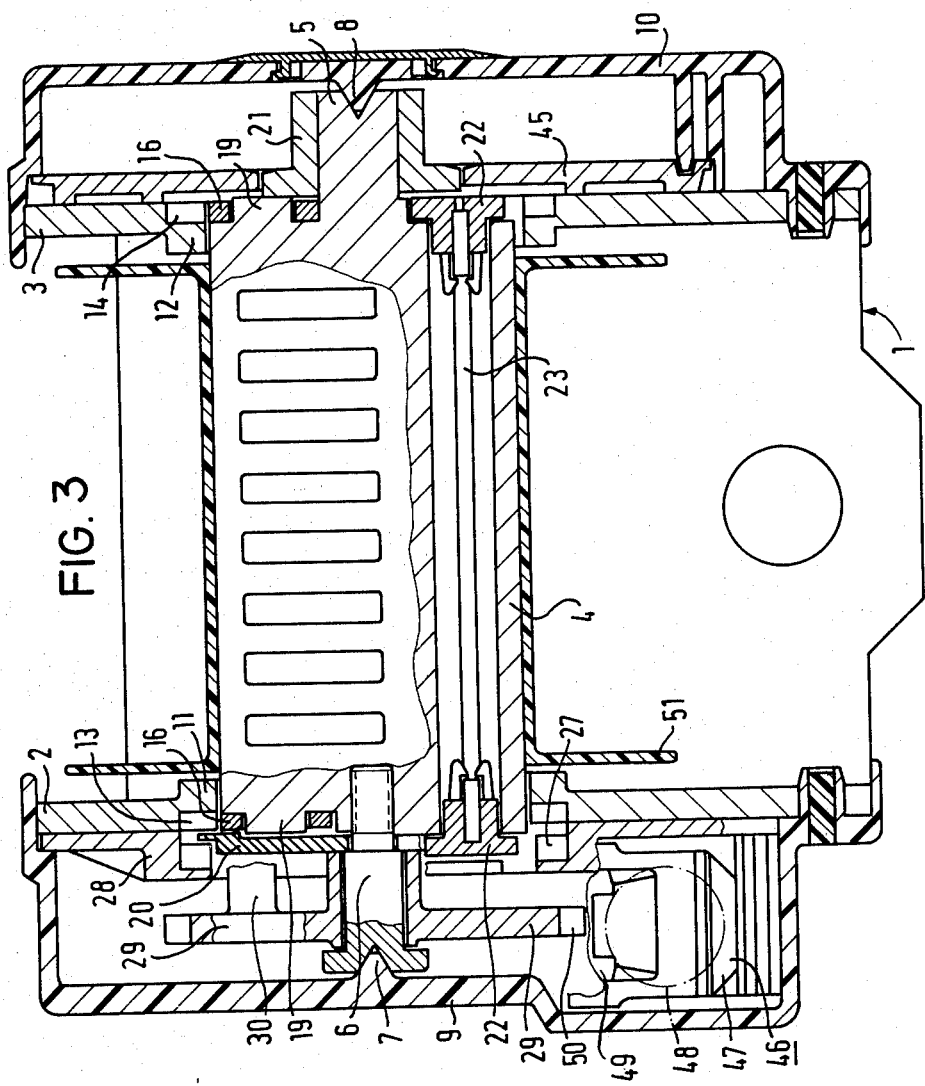

ROLL-UP DEVICE FOR SAFETY BELT

This is a continuation of application Ser. No. 059,624, filed July 23, 1979, now abandoned.

CROSS-REFERENCE TO RELATED APPLICATION

Our application Ser. No. 059,636, filed on July 23, 1979, now U.S. Pat. No. 4,307,852 assigned to REPA Feinstanzwerk GmbH, the assignee of the present invention.

BACKGROUND OF THE INVENTION

1. Field of the Invention

The invention relates to a roll-up device for a safety belt with a provision for blocking the belt shaft in case of danger. The belt shaft is blocked by locking pawl means with locking teeth and a locking pawl which is operable by an automatically triggered release mechanism over a control element when the permissible acceleration or deceleration of the vehicle is exceeded.

2. Description of the Prior Art

In known roll-up devices for safety belts of the above-mentioned type (U.S. Pat. No. 3,901,459) a roll-up spring is arranged on one side of the belt shaft while the opposite end of the shaft is provided with locking pawl means and also with a release mechanism. In case of danger, i.e. when an acceleration or deceleration exceeding a permissible level occurs, the release mechanism which, for example, consists of an inertial mass, acts upon a control disc and the control disc effects blocking of the belt shaft by means of the locking pawl. Therein, the locking pawl and the locking teeth which are arranged in the same plane as the locking pawl, are disposed along the side plates of the U-shaped basic frame whereby the element with the locking teeth or the locking pawl are connected to the corresponding side plate through connecting pins or the like. This results, particularly when the locking elements are arranged on both sides of the basic frame, in a construction of relative great width. Therefore the connecting parts between the side plates and the locking teeth, or the locking pawl, must be made very stable or strong and therefore expensive, in order to withstand the extremely high pull forces at the safety belt and thereby at the belt shaft when it is blocked, and also to withstand the shearing forces associated therewith.

SUMMARY OF THE INVENTION

An object of the present invention is to provide a roll-up device for a safety belt which is of narrow width and without special construction complexity, and has good stability with respect to locking of the belt shaft and the parts directly associated therewith.

With the foregoing and other objects in view, there is provided in accordance with the invention, a roll-up device for a safety belt in a motor vehicle having a frame with side plates, a rotatable belt shaft on which a safety belt is wound, locking pawl means with locking teeth and a locking pawl activated by a control element operable by a release mechanism which is triggered when the vehicle exceeds a permissible acceleration or deceleration, a cutout in at least one of the side plates, one end of said belt shaft extending into said cutout, and said locking teeth and said locking pawl which when activated by said control element block the belt shaft, also disposed in said cutout.

Other features which are considered as characteristic for the invention are set forth in the appended claims.

Although the invention is illustrated and described herein as embodied in a roll-up device for safety belts, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which

FIG. 3 is a detailed representation shown in a longitudinal sectional view of a roll-up device for safety belts according to FIGS. 1 and 2;

DETAILED DESCRIPTION OF THE INVENTION

Figure 2:
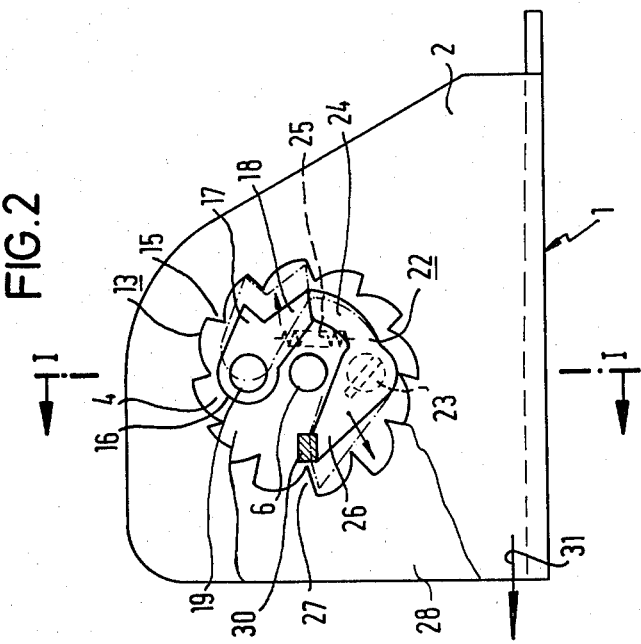
FIG. 2 is a side view of the roll-up device shown in FIG. 1.

In accordance with the invention, the locking teeth, as well as the locking pawl are arranged inside a cutout (perforation) in at least one of the side plates of the basic frame of the roll-up device.

The belt shaft also extends through this opening. In the case of locking from the outside toward the inside, the locking teeth are directly at the belt shaft while the openings in the side plates surround these locking teeth with more or less large bearing play in the form of smooth bearing bores. In the case of locking from inside toward the outside, the locking pawl is supported on the belt shaft and limiting surfaces of these bearing openings are, at least partly, formed as locking teeth. By integration of locking teeth and locking pawl into the side plates of the stable basic frame, no further construction space is required outside of the basic frame for the above-mentioned elements. This also assures that no shearing forces are encountered at the locking teeth and locking pawl in the case of blocking i.e. when very high pull forces are acting on the belt shaft. As a result, the construction of the roll-up device can be simplified and excellent stability can still be achieved.

In a further advantageous embodiment, the side plates are provided with axially offset bearing projections for the belt shaft. The locking teeth are arranged in the space formed by the offset projection within each side plate. In this way, the bearing for the belt shaft and the locking teeth are a direct part of the very stable side plates of the basic frame. Such offset projections are very easily fabricated by stamping.

An increase of the stability of the roll-up device and avoiding one-sided mechanical loading in the case of blocking can be achieved by arranging locking pawls and corresponding locking teeth in the bearing openings or cutouts of the side plates at each end of the belt shaft. The locking pawls are fixedly connected with each other by means of a rod.

An additional integration of the parts directly responsible for locking in the side plates of the U-shaped basic frame can be achieved by arranging a control lever which acts in conjunction with a release mechanism, within the bearing opening or cutout of the side plates. This control lever is in addition to the locking pawl and to the locking teeth which form a part of the inner surface of the cutout in the side plate. Thus, the locking pawls which, for example, are arranged on both sides of the belt shaft do not increase the construction width of the roll-up device for the safety belt.

According to a further embodiment of the invention, the control lever is formed as a two-armed lever. One side of the lever has an operating or work projection which functions with the locking pawl and, the other side of the lever has an engagement tooth which engages the teeth of a toothed plate connected to the side plate. When activated to block the belt shaft, the locking pawls which are preferably arranged on both sides of the belt shaft, are moved by the control levers into either outside or inside positioned stamped locking teeth whereby the locking is effected. The control lever at the same time hinders tooth-to-tooth locking of the locking pawls.

A further advantageous embodiment of the invention results by providing the belt shaft on both sides of the side plates with a bearing, preferably of synthetic material, with a small (precise) bearing diameter with little bearing play. Thereby the belt shaft is centered with respect to the approximate bearing by the cutouts perforations which have relatively large bearing play when the belt shaft is loaded when locking occurs. The two types of bearings are the small bearing which is preferably designed as a conical bearing, and the approximate bearing in the cutouts of the side plates. The combined action of the two bearings operate in such a manner that, in the case of blocking i.e. when high-pulling forces act on the belt shaft, the small bearings which at normal use of the safety belt i.e. at the normal attaching and detaching of the safety belt, are noiseless and easily-rolling, cannot absorb the high-pulling force and yield, so that the total pull force is absorbed by the extremely stable large bearings in the side plates. Thereby, no special requirements are necessary with respect to stability of the small bearings nor for precision of the large bearings, so that the cutouts in the side plates can be made, for example, as simple openings which can be produced by stamping at low cost. Inexpensive plastic parts may be used for the small bearings. Furthermore, the friction moment of the bearing is reduced by the particular design of the small bearing as a conical bearing or sleeve bearing with a small bearing diameter, and consequently, the noise and the force required at normal use is reduced to a minimum.

Further advantageous details of the invention are shown in the drawings and the sample embodiments which are described in the following.

Figure 1:
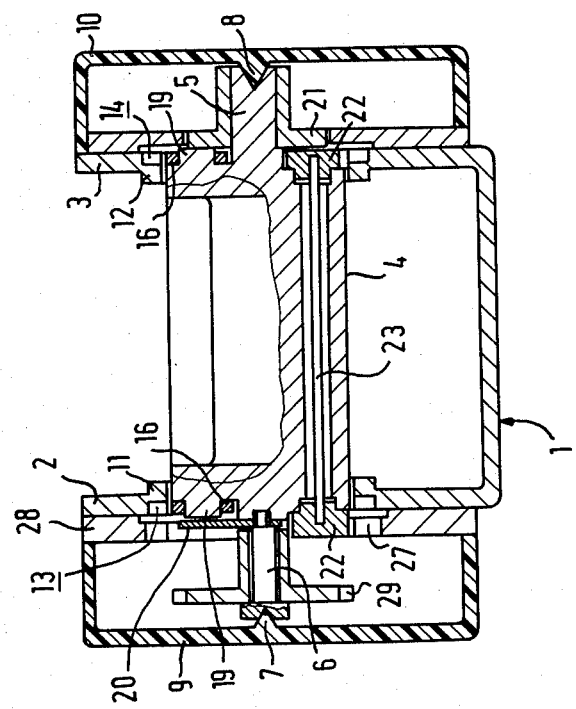
FIG. 1 is a schematic representation of the first embodiment of the roll-up device for safety belts according to the invention with locking means from inside toward the outside in a sectional view taken along line I—I of FIG. 2.

In the schematically shown embodiment according to FIGS. 1 and 2, a metallic, U-shaped basic frame 1 is provided with side plates 2 and 3. A roll-up roller shaft has on opposite ends shaft projections 5 and 6. The projections 5 and 6 which extend beyond the side plates 3 and 2, have axial bearing recesses (recessed centers) which serve as bearings without play. The roll-up shaft 4 is supported on bearing protrusions 7 and 8 in the covers 9 and 10 which are disposed on the side plates 2 and 3, and are preferably made of plastic material. The bearing recesses in conjunction with the bearing protrusions 7, 8 form conical bearings which, though they cannot withstand the high radial loads when the belt is locked in case of a crash, provide low friction and noiseless operation when normally unrolling the safety belt, for example, when attaching or detaching the belt. The bearing protrusions 7 and 8 can be manufactured very economically as injection-molded synthetic parts. In the embodiment according to FIGS. 1 and 2, the side plates 2 and 3 have bearing surfaces 11 and 12, which are pulled in or offset toward the inside. The belt shaft 4 is supported inside the bearing surfaces 11 and 12 with its circumference having some radial play. At the height of the bearing offsets of the side plates 2 and 3 are inside locking teeth 13, 14 which are integrated within the plate thickness and which have saw-tooth-shaped locking teeth 15, which, in case of locking, or in the case of a crash, work in conjunction with a locking pawl 16. The locking pawls 16, each of which has two locking teeth 17 and 18, are supported on bearing pins 19 of the belt shaft 4, and are kept in the prescribed position by retainer plates 20 and flange collar 21. A two-armed control lever 22 is rotatably supported at each end of the shaft 4. Both control levers 22 are fixedly connected with each other by a rod 23 which is rotatably supported on bearings within the shaft. Each control lever 22 is provided with a work-projection 24 which acts together with a slide surface of the locking pawl 16, said work-projection being tensioned against the locking pawl 16 by means of spring 25. The control lever 22 is also provided with a locking tooth 26, which, when the control lever 22 is moved in the direction of the arrow (FIG. 2) engages in the inner tooth means 27 of a toothed plate 28 disposed on side plate 2. The mentioned displacement of the control lever 22, and thereby the motion of the locking pawls 16 into the locking position is effected by the control- or inertia disc 29 which is rotatably supported on projection 6 of the belt shaft 4. The inertia disc is provided with a coupling element or coupling means 30 which acts together with a slide-surface of the control lever 22 and which, in case of an extreme negative or positive acceleration of the vehicle in which the roll-up device is used, is stopped for at least a short time period by a release mechanism which is not shown in FIGS. 1 and 2, and which will be described later, and causes a displacement of the control lever 22, and thereby of the locking pawls 16 against the force of the spring 25. In the case when the weight of the passenger acts on the belt and the belt shaft 4 in direction of the arrow 31 (FIG. 2) the conical bearing 7/8 will give and the total pull-forces are absorbed by the large bearing 11, 12 of the stable basic frame 1. Thereby, very short locking times result because of the short path of the locking members from the inside toward the outside.

In the embodiments according to FIGS. 3 to 5, 6 and 7, the parts which correspond to the corresponding parts in FIG. 1 and 2 functionally, are designated by the same numbers.

Figure 4:
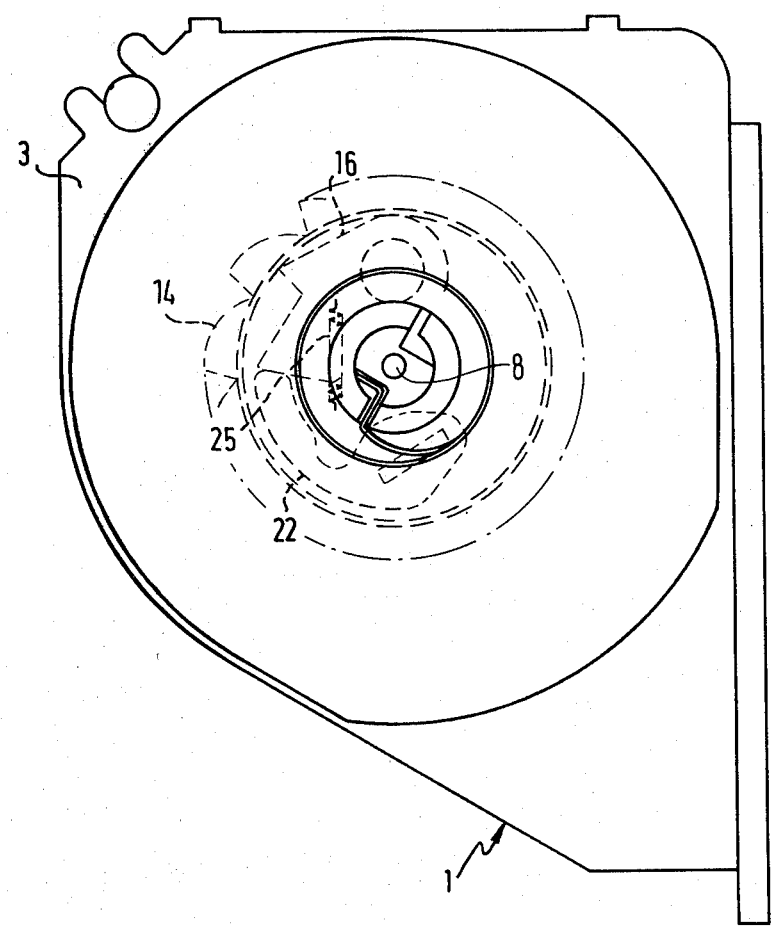
FIG. 4 is a side view of the roll-up device of FIG. 3 viewed from one side.
Figure 5:
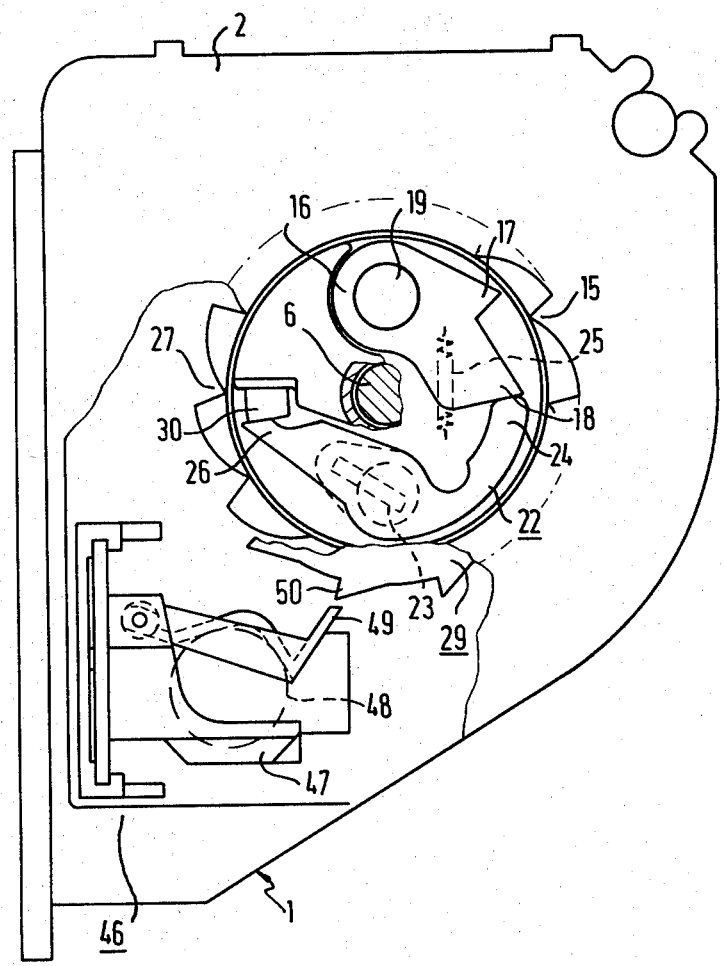
FIG. 5 is a side view of the roll-up device of FIG. 3 viewed from the other side.

In the embodiments according to FIGS. 3, 4 and 5, as in the embodiments of FIGS. 1 and 2, the side plates 2 and 3 have bearing means 11, 12 offset toward the inside and each is provided with locking teeth 13, 14 which are open toward the outside and which work in conjunction with locking pawls 16 within the region inside of the side plates for blocking the belt shaft 14. The locking teeth 13, 14 are partially covered by the retainer plates 20 and 21. The axial portion of the retainer plate 21 serves as stud for supporting the roll-up spring which is not shown, which spring is disposed in the free space between the cover 10 and the buffer disc 45 which is arranged in front of the side plate 3. In FIG. 3, the conical bearings 7, 8 can readily be seen. Furthermore, from FIGS. 3 and 5, the already mentioned release mechanism 46 can be clearly distinguished. Mechanism 46 consists of a massive ball 48 which is disposed in a bearing recess 47 which is open on top and of a control lever 49 which loosely rests on the ball 48 whereby in case of danger i.e. when acceleration of the vehicle exceeds a predetermined level, the free leg of the control lever 49 which extends upwardly, is displaced upwardly by the displacement of the ball 48 and locks with the outer teeth 50 of the control disc 29 and stops the latter at least for a short time period. Thereby, the control element 30 of the control disc 29 displaces the control levers 22 which are connected with each other, and also moves the locking pawls 16 into the already explained locking position. Furthermore, it will be noted from FIG. 3 that the roll-up shaft 4 supports a belt pulley 51 which is provided with side flanges. Finally, the Figures clearly show that the release mechanism 46 is disposed at the inner teeth 27 of the tooth- or bearing plate 28 for the control lever 22. In the embodiment, the bearing projection which is designated as 6, is a threaded stud which is screwed into the body of the belt shaft 4 which is provided with the female thread. The bearing projection 6 has the bearing recess for the conical bearing 7.

Figure 6:
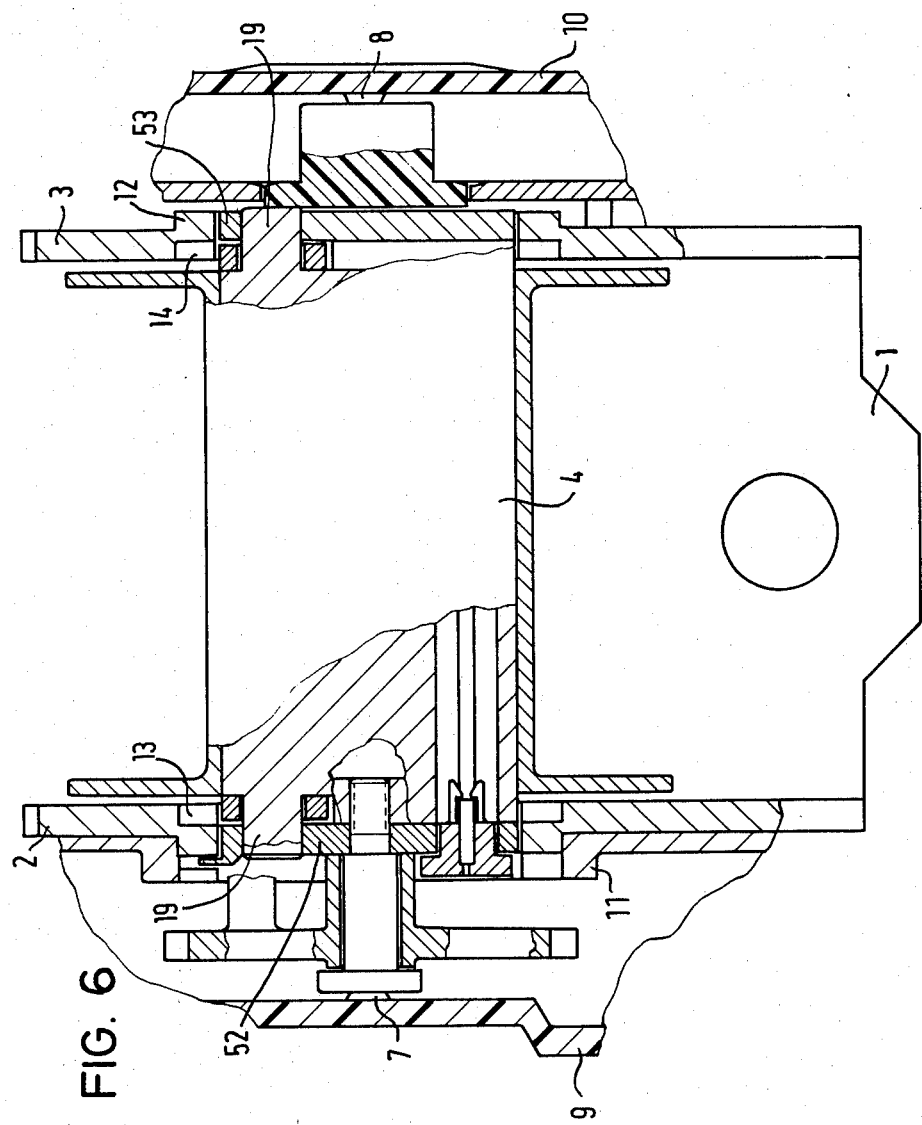
FIG. 6 is a sectional view of another embodiment of the roll-up device shown in FIGS. 1 and 2.
Figure 7:
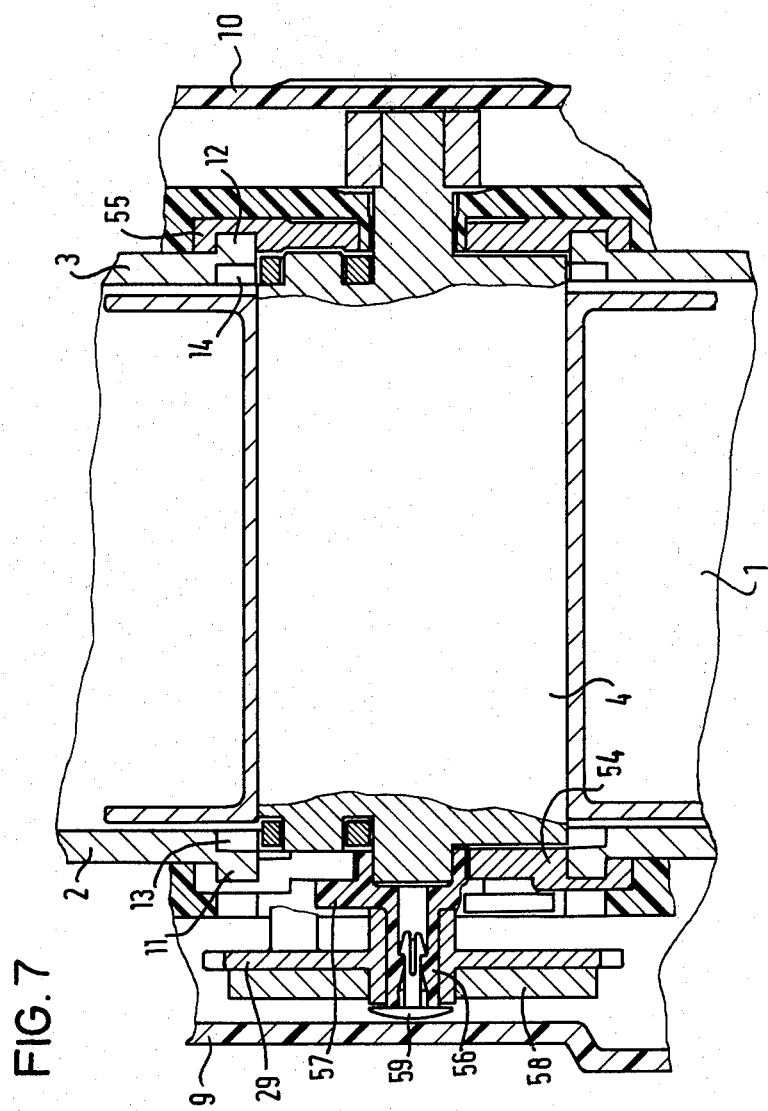
FIG. 7 is a sectional view of a further embodiment of a roll-up device for safety belts with locking means from inside toward the outside.

In the embodiment according to FIGS. 6 and 7, only those parts of the roll-up device for a safety belt are shown which are necessary for understanding the device. In contrast to the embodiment of FIGS. 3 and 5, the bearings 11 and 12 of the side plates 2 and 3 of the U-shaped basic frame 1 are offset toward the outside so that the locking teeth 13, 14 are accessible from the inside. In the embodiment according to FIG. 6, the bearing hubs 19 of the belt shaft 4 extend through the bearing discs 52 and 53 which are disposed on both sides of the bearing shaft 4 and serves as follower elements. In contrast thereto, in the embodiment according to FIG. 7, the bearing discs 54 and 55 enclose the bearings of the side plates 2 and 3 with annular peripheral rims whereby the side plates here are offset toward the outside. The bearing arrangement of the belt shaft 4 is here only effected by the bearings 11 and 12, in which the bearing discs 54 and 55 are supported. The control disc 29 which is provided with an inertia disc 58 is supported on a shell 56 with a bearing flange 57 which is made out of synthetic material and is secured by a lockable fastener 59 with spring elements within the bearing flange 57.

There are claimed:

1. Roll-up device for a safety belt in a motor vehicle having a metal frame with two side plates, a rotatable belt shaft on which a safety belt is wound, locking pawl means which include locking teeth and a locking pawl at each end of said belt shaft with one of said locking teeth and said locking pawl attached to each said side plate and the other to said belt shaft, a control element and a release mechanism, said locking pawl means activated by said control element operable by said release mechanism which is triggered when the vehicle exceeds a permissible acceleration or deceleration to cause said locking pawl to engage said locking teeth, a cutout in each of the side plates, each end of said belt shaft extending into one of said cutouts of the two side plates, and said locking teeth and said locking pawl which when activated by said control element block the belt shaft, also disposed in said cutout, and wherein the side plates are shaped in the regions of the cutouts to form annular projections which are offset with respect to the side plates leaving spaces adjacent the projections in the side plates, said projections acting as bearings for the belt shaft, and the locking teeth arranged within said spaces of said cutouts of the side plates.

2. Roll-up device for a safety belt according to claim 1, wherein each locking pawl at each end of the belt shaft is rotatably supported on a bearing pin of the belt shaft inside the cutout.

3. Roll-up device for a safety belt according to claim 1, wherein, in addition to said locking pawl and said locking teeth disposed in the cutout in one of the two side plates, said control element which acts in conjunction with said release mechanism serving for the operation of the locking pawl is also arranged within the same cutout.

4. Roll-up device for a safety belt according to claim 3, wherein the control element is formed as a two-armed lever and is provided, on one side, with a work projection which acts to move said locking pawl within the same cutout into engagement with said locking teeth and is provided on the other side, with a locking tooth, and wherein a tooth-plate is connected with the side plate, and wherein said locking tooth of said two-armed lever engages a tooth of said tooth-plate.

5. Roll-up device for a safety belt according to claim 1, wherein the cutout at each end of the belt shaft is at least partly closed by a securing member disposed adjacent to the belt shaft.

6. Roll-up device for a safety belt in a motor vehicle having a metal frame with two side plates, a rotatable belt shaft on which a safety belt is wound, locking pawl means which include locking teeth and a locking pawl at each end of said belt shaft with one of said locking teeth and said locking pawl attached to each said side plate and the other to said belt shaft, a control element and a release mechanism, said locking pawl means activated by said control element operable by said release mechanism which is triggered when the vehicle exceeds a permissible acceleration or deceleration to cause said locking pawl to engage said locking teeth, a cutout in at least each of the side plates, each end of said belt shaft extending into one of said cutouts of the two side plates, and said locking teeth and said locking pawl which when activated by said control element block the belt shaft, also disposed in said cutout, and wherein said locking pawls are in fixed connection with each other by means of a rod.

7. Roll-up device for a safety belt in a motor vehicle having a metal frame with two side plates, a rotatable belt shaft on which a safety belt is wound, locking pawl means which include locking teeth and a locking pawl at each end of said belt shaft with one of said locking teeth and said locking pawl attached to each said side plate and the other to said belt shaft, a control element and a release mechanism, said locking pawl means activated by said control element operable by said release mechanism which is triggered when the vehicle exceeds a permissible acceleration or deceleration to cause said locking pawl to engage said locking teeth, a cutout in each of the side plates, each end of said belt shaft extending into one of said cutouts of the side plates and said locking teeth and said locking pawl which when activated by said control element block the belt shaft, also disposed in said cutout, and wherein the side plates are shaped in the regions of the cutouts to form annular projections which are offset with respect to the side plates leaving spaces adjacent the projections in the side plates, said projections acting as bearings for the belt shaft, and the locking teeth arranged within said spaces of said cutouts of the side plates and wherein the belt shaft is supported on both sides of the side plates in a precise bearing, said precise bearing having little bearing play, and is centered with respect to the cutouts, said cutouts representing bearings with relatively great bearing play for the belt shaft when it is loaded in the case of locking.

8. Roll-up device for a safety belt according to claim 7, wherein the precise bearing yields radially under load.

9. Roll-up device for a safety belt according to claim 8, wherein the precise bearing is a bearing made of synthetic material with a small bearing diameter relative to the diameter of the belt shaft.

10. Roll-up device for a safety belt according to claim 8, wherein the precise bearing is formed as a conical bearing.

11. Roll-up device for a safety belt in a motor vehicle having a metal frame with two side plates, a rotatable belt shaft on which a safety belt is wound, locking pawl means which include locking teeth and a locking pawl at each end of said belt shaft with one of said locking teeth and said locking pawl attached to each said side plate and the other to said belt shaft, a control element and a release mechanism, said locking pawl means activated by said control element operable by said release mechanism which is triggered when the vehicle exceeds a permissible acceleration or deceleration to cause said locking pawl to engage said locking teeth, a cutout in at least each of the side plates, each end of said belt shaft extending into one of said cutouts of the two side plates, and said locking teeth and said locking pawl which when activated by said control element block the belt shaft, also, disposed in said cutout, wherein the side plates are shaped in the regions of the cutouts to form annular projections which are offset with respect to the side plates leaving spaces adjacent the projections in the side plates, said projections acting as bearings for the belt shaft, and wherein said locking pawls are in fixed connection with each other by means of a rod.

* * * * *